United States Patent [19]

Beaupre

[11] Patent Number: 5,129,612
[45] Date of Patent: Jul. 14, 1992

[54] COLLAPSIBLE STAND FOR STABILIZING GROCERY BAGS IN TRANSIT

[76] Inventor: Bertram T. Beaupre, 496 Haymore Ave. North, Worthington, Ohio 43085

[21] Appl. No.: 747,060

[22] Filed: Aug. 19, 1991

Related U.S. Application Data

[63] Continuation of Ser. No. 483,792, Feb. 23, 1990, abandoned.

[51] Int. Cl.$^5$ .............................................. F16M 11/24
[52] U.S. Cl. ................................... 248/166; 224/42.42; 248/95
[58] Field of Search ............... 248/166, 165, 149, 150, 248/95, 97; 224/42.42 R, 42.34, 42.45 R, 273; 16/244; 211/13; D19/34.1, 34.2, 34.3, 34.5

[56] References Cited

U.S. PATENT DOCUMENTS

| 770,395 | 9/1904 | Seng | 16/344 X |
|---|---|---|---|
| 3,343,206 | 9/1967 | Mannerheimo | 16/344 |
| 3,404,818 | 10/1968 | Miscoe | 224/42.42 |
| 4,029,244 | 6/1977 | Roberts | 224/42.42 R |
| 4,189,056 | 2/1980 | Majewski | 224/42.42 R X |
| 4,305,519 | 12/1981 | Gerich | 220/7 |
| 4,372,512 | 2/1983 | Wolfe | 224/42.42 R X |
| 4,540,213 | 9/1985 | Herlitz et al. | 224/42.42 R X |
| 4,684,087 | 8/1987 | Spickard | 248/97 |
| 4,718,584 | 1/1988 | Schoney | 224/42.42 R |
| 4,746,041 | 5/1988 | Cook et al. | 224/42.42 |

Primary Examiner—Ramon O. Ramirez
Attorney, Agent, or Firm—Porter, Wright, Morris & Arthur

[57] ABSTRACT

A base plate and a back plate are pivotally connected by hinge members which snap-fit together. A brace plate is pivotally connected to the back plate and is disposed in angular relation thereto in its operative position. A grocery bag may be seated on the upper surface of the base plate, while the lower surface of the base plate is ribbed to prevent the plate from slipping. The back plate holds the grocery bags in an upright position, and the brace plate prevents the back plate from breaking or bending beyond a 90 degree angle.

8 Claims, 1 Drawing Sheet

COLLAPSIBLE STAND FOR STABILIZING GROCERY BAGS IN TRANSIT

RELATED APPLICATION

This is a continuation of Ser. No. 483,792 filed Feb. 23, 1990, now abandoned.

BACKGROUND OF THE INVENTION

The present invention relates to portable apparatus for supporting and stabilizing grocery bags and the like in an upright position, and more particularly to those devices which are adapted for use in transport vehicles.

The majority of today's shopping for groceries and sundry other items is done far enough away from home that it requires the use of a transport vehicle, be it car, van or truck. A shopping visit to the local supermarket will result in a bag or bags containing miscellaneous items, some breakable or just plain fragile. In any event, when bags are placed in the trunk of a car, on the seat, on the floor, in the bed of a truck, or on the floor of a van, they become subject to the movements of the vehicle when leaving its parking space. Even a slow speed cornering movement can cause them to tip.

Prior art of various constructions have addressed the problem of supporting grocery bags in an upright position while in transit. For example, U.S. Pat. No. 4,746,041 to Cook, et al., (1988); No. 4,718,584 to Schoeny (1988); No. 4,684,087 to Spickard (1987); No. 4,372,512 to Wolfe (1983); No. 4,305,519 to Gerich (1981); No. 4,029,244 to Roberts (1977); and No. 3,404,818 to Miscoe (1966) show various apparatus for restraining grocery bags or packages in vehicle cargo areas. While the foregoing patented devices may be sound in principle, they require time to set up or assemble and, although collapsible, or when disassembled, take up valuable space when stored. Thus, the present inventor was faced with the problems of designing a grocery bag stand that was truly portable and usable outside of a trunk or other designated vehicle storage area, such as the back seat, the floor area between van seats and other unobstructed spaces.

SUMMARY AND OBJECTS OF THE INVENTION

The present invention is a stand for stabilizing a grocery bag and the like in an upright position in a transport vehicle. The subject stand basically comprises a base plate, a back plate, a brace plate, a first hinge device for pivotally connecting the base plate and the back plate together and a second hinge device for pivotally connecting the back plate and brace plate together. The base plate is formed with a bag-engaging upper surface and a vehicle-engaging under surface. The under surface is contoured to assist in gripping the vehicle. The back plate is formed with a bag-engaging inner surface and with a relatively opposing outer surface. The brace plate is formed with relatively opposing inner and outer surfaces and with a vehicle-engaging lower edge. The first hinge device permits the base plate and back plate to move between an operative position in which the plates are generally perpendicular to one another and a collapsed position in which the bag-engaging surfaces of the plates are disposed in closely spaced convergent relation to one another. The second hinge device permits the brace plate to move between a supporting position in which it is angularly disposed relative to the back plate and a retracted position in which it is disposed in closely spaced, convergent relation to the back plate.

A primary object of the present invention is to provide a support apparatus that prevents the contents of a grocery bag from spilling during transport in a car or other motor vehicle. Another object of the present invention is to provide a stand that can be quickly stored or placed in an operative position in several different locations in the vehicle, as well as providing easy access to the bags. Yet another object of the present invention is to provide a stand which is more portable, less expensive, and more durable than those heretofore available.

DETAILED DESCRIPTION OF THE PREFERRED EMBODIMENT

Figure 1:
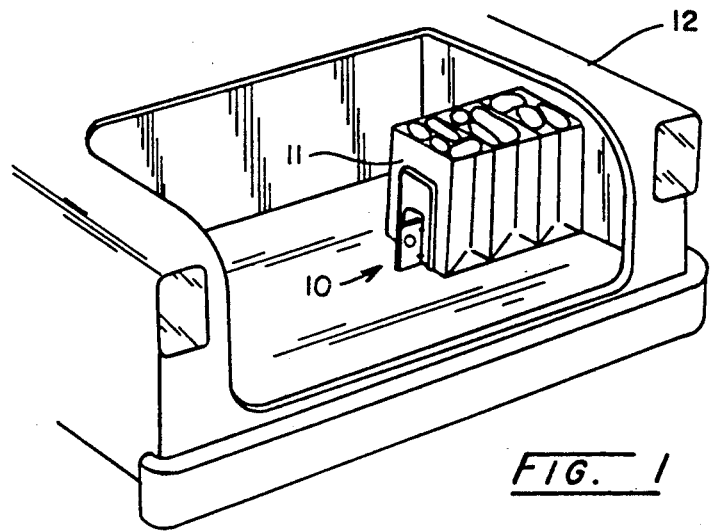
FIG. 1 is a perspective view of an open trunk showing one application of a grocery bag stand according to the present invention.

As indicated in FIG. 1, the present stand, generally designated 10, is adapted to stabilize one or more grocery bags 11 in an upright position in a transport vehicle 12. While the trunk of the vehicle 12 has been illustrated, the present stand may also be used with advantage on a seat, the floor or elsewhere in the vehicle.

Figure 2:
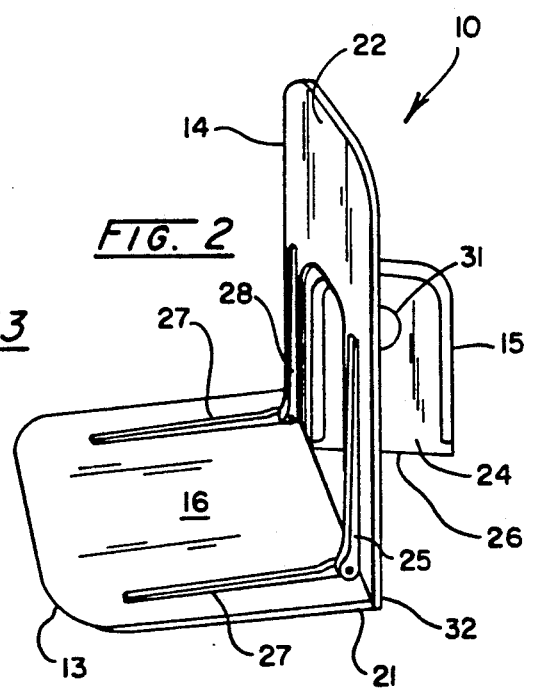
FIG. 2 is an enlarged perspective view of the present grocery bag showing its base, back and brace plates in their operative positions.
Figure 4:
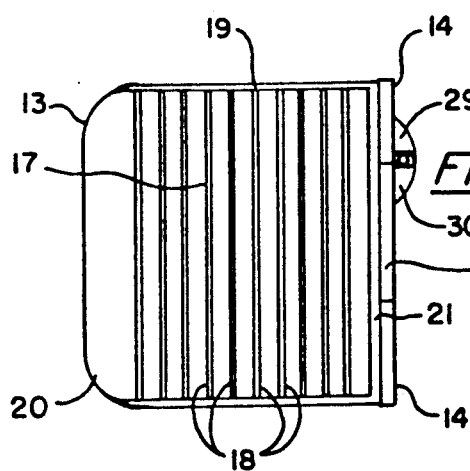
FIG. 4 is a bottom plan view of the present stand particularly illustrating the underside of the base plate.

As best indicated in FIG. 2, the present stand 10 is provided with a base plate 13, a back plate 14, and a brace plate 15. The base plate 13 is formed with a bag-engaging upper surface 16 and a vehicle-engaging under surface 17 (FIG. 4). The under surface 17 is contoured to assist in gripping the vehicle 12, for instance, the carpeting or matting in the trunk or on the floor of a car. Preferably, the contouring is in the form of a plurality of relatively spaced part, downwardly projecting ribs 18. Alternatively, a rough, sandpaper-like surface may be provided. In addition, a perimeter ridge 19 projects downwardly substantially the same distance as the ribs 18. It is also preferable for the base plate 13 to have a slightly wedge-shaped or tapered profile, wherein its free end 20 is thinner than its attached end 21. Accordingly, the depth of the ribs 18 and perimeter ridge 19 decrease towards the free end 20 to the Point where they are no longer present.

Figure 3:
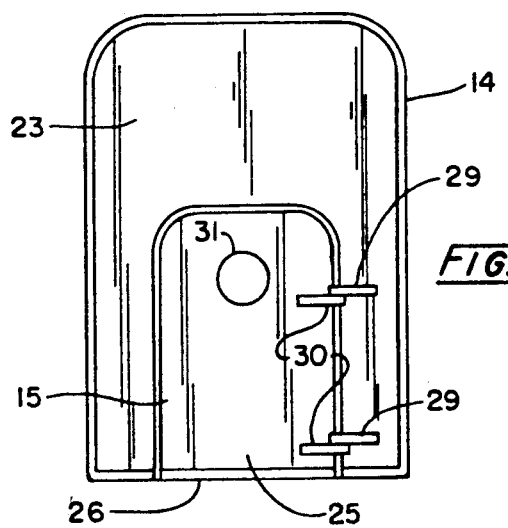
FIG. 3 is a rear elevational view of the brace plate in its retracted position relative to the back plate.

The back plate 14 is formed with a bag-engaging inner surface 22 (FIG. 2) and a relatively opposing outer surface 23 (FIG. 3). Likewise, the brace plate 15 is formed with relatively opposing inner 24 (FIG. 2) and outer 25 (FIG. 3) surfaces and with a vehicle-engaging lower edge 26.

As further indicated in FIG. 2, a first hinge device comprises a pair of relatively spaced apart hinge members 27 projecting from the upper surface 16 of the base plate 13 and a cooperative pair of hinge members 28 projecting from the inner surface 22 of the back plate 14. The cooperative pairs of hinge members 27,28 are joined together to permit pivotal movement of the base and back plates between an operative position shown in FIG. 2 in which the plates are generally perpendicular to one another and a collapsed position shown in FIG. 5 in which the plates are in closely spaced, convergent relation to one another. Preferably, the hinge members 27, 28 are tapered and elongated. This configuration is particularly advantageous on the base plate 13, where the elongation and tapering assist in inserting the base plate under a grocery bag.

Figure 5:
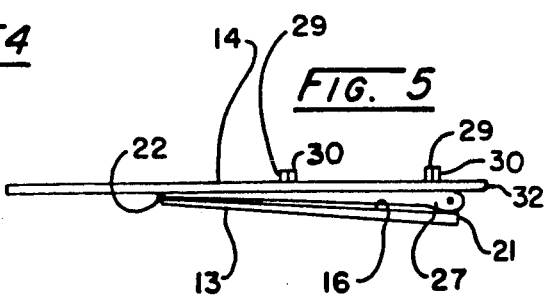
FIG. 5 is a side elevational view of the present stand in its fully collapsed position.

As indicated in FIGS. 3-5, a second hinge device comprises a pair of relatively spaced apart hinge members 29 projecting from the outer surface 23 of the back plate 14 and a cooperative pair of relatively spaced apart hinge members 30 projecting from the outer surface 25 of the brace plate 15. The cooperative pairs of hinge members 29, 30 permit the brace plate 15 to move between a supporting position in which the brace plate is angularly disposed relative to the back plate 14 (FIG. 2) and a retracted position in which the brace plate 15 is disposed in closely spaced, convergent relation to the back plate 14 (FIGS. 3-5). Preferably, the brace plate 15 is formed from the back plate 14 and is implanted thereon in such a manner that the brace plate 15 is substantially coplanar with the back plate 14 in the retracted position (FIG. 4).

Advantageously, the base 13, back 14 and brace 15 plates may be integrally formed from synthetic resin material in such a manner that the cooperative hinge members 27, 28 and 29, 30 snap-fit together. The cooperative hinge members 27, 28 on the base and back plates 13, 14 are relatively elongated and tapered structures. Each is provided with an enlarged head having either an integrally formed pivot pin or a pin-receiving bore. The cooperative hinge members 29, 30 on the back and brace plates 14, 15 are substantially shorter than their counterparts on the bag-engaging surfaces 16, 22 of the base and back plates. Nevertheless, the cooperative hinge members 29, 30 on the outer surfaces of the back and brace plates 14, 15 are also preferably equipped with either a pin receiving bore or a pivot pin integrally formed thereon. It is also advantageous to provide a finger opening 31 in the brace plate 15 to assist in moving it to the operative position.

As indicated in FIG. 5, the enlarged portions of the hinge members 27 and 28 (not shown) are disposed in juxtaposition to the attached end 21 of the base plate 13 and adjacent to a lower edge portion 32 of the back plate 14. In this manner, as indicated in FIG. 2, the lower edge portion 32 of the back plate 14 abuts against the attached end 21 of the base plate 13 when said plates are in their perpendicular, operative position relative to one another. In this manner additional support is provided for the back plate 14.

In order to use the present stand 10, the operator simply withdraws the stand from storage in a collapsed state and opens the base plate 13 and back plate 14 relative to one another. One of the grocery bags 11 or other articles to be stabilized is placed against a stationary vertical portion of the vehicle, such as a trunk wall or seat back. Additional bags, if any, are abutted against the first bag in linear fashion. The operator then pushes the base plate 13 of the stand under the outermost grocery bag until the back plate 14 engages the bag wall and all of the bags are snugly disposed between the back plate 14 and the vertical portion of the vehicle. The brace plate 15 is then shifted to its operative position. The weight of the groceries or other items within the bag provides sufficient force for the contoured surface 18 to engage the carpeting in the trunk and thereby prevent the under surface 17 of the base plate 13 from slipping.

In this manner, a collapsible grocery bag stand which is compact, durable, inexpensive, and effective is provided. While a single preferred embodiment has been illustrated and described in some detail, the foregoing drawings and written description are not intended to limit unduly the spirit of the invention or the scope of the following claims.

I claim:

1. A stand for stabilizing cargo in an upright position in a transport vehicle, said stand comprising:
   (a) a base plate formed with a cargo-engaging upper surface and a vehicle-engaging under surface, said under surface being contoured to assist in gripping said vehicle;
   (b) a back plate formed with a cargo-engaging inner surface and a relatively opposing outer surface;
   (c) a brace plate defining a cut-out portion in the back plate and formed with relatively opposing inner and outer surfaces and a vehicle-engaging lower edge;
   (d) first hinge means pivotally connecting the base plate and the back plate together for movement between an operative position in which said plates are generally perpendicular to one another and a collapsed position in which said plates are disposed in closely spaced, generally stacked relation to one another; and
   (e) second hinge means pivotally connecting the back plate and brace plate together for movement between a supporting position in which the brace plate is angularly disposed relative to the back plate and a retracted position in which the inner and outer surfaces of the brace plate are disposed, respectively, in substantially coplanar relation to the inner and outer surfaces of the back plate.

2. The stand according to claim 1, wherein the first hinge means comprises a pair of relatively spaced apart hinge members integrally formed on the cargo-engaging surface of the base plate and a cooperative pair of relatively spaced apart hinge members integrally formed on the cargo-engaging surface of the back plate.

3. The stand according to claim 1, wherein the second hinge means comprises cooperative pairs of hinge members integrally formed on the outer surfaces of the back plate and the brace plate in spaced relation to one another.

4. The stand according to claim 1, wherein a lower edge portion of the back plate adjacent to the first hinge means abuts against an end portion of the base plate, with said back and base plates disposed in the operative position.

5. The stand according to claim 2, wherein the cooperative pairs of hinge members on the cargo-engaging surfaces of the base plate and the back plate snap-fit together.

6. The stand according to claim 2, wherein each of the hinge members on the base plate is elongated and tapered.

7. The stand according to claim 3, wherein the cooperative pairs of hinge members on the outer surfaces of the back plate and the brace plate snap-fit together.

8. The stand according to claim 1, wherein the base plate is tapered and includes a free end of lesser thickness than an opposite end disposed adjacent to the back plate.

* * * * *